United States Patent Office 2,833,719
Patented May 6, 1958

2,833,719

LUBRICATING OIL ADDITIVE COMPOSITIONS AND LUBRICATING OIL COMPOSITIONS

William L. Van Horne, Cheltenham, and Herman H. Radtke, Feasterville, Pa., assignors to Rohm & Haas Company, Philadelphia, Pa., a corporation of Delaware No Drawing. Application March 25, 1955
Serial No. 496,944

10 Claims. (Cl. 252—42.7)

This invention relates to lubricating oil additive compositions and lubricating oil compositions and is particularly concerned with the incorporation of additives for the improvement of the viscosity index, the detergency, lowering of the pour point and improvement of other characteristics.

The addition of oil-soluble polymeric esters of the acrylic series to lubricating oils is now quite a common practice in the art and serves primarily to improve the viscosity index and to depress the pour point. However, in certain types of oils, it is desirable to supplement this type of additive with an additional material to assist in reducing gummy deposits. This latter type of additive is generally termed a detergent.

It has now been found that, when the polyacrylic ester type of viscosity index improver is used in conjunction with certain oil-soluble metallo-organic detergents heretofore used, namely the type generally referred to as the alkaline earth and aluminum phenates which comprise the alkaline earth metal and aluminum salts of higher alkyl substituted phenols, of alkyl substituted phenol sulfides, and of the condensates of three to ten moles of a higher alkyl substituted phenol with at least two to seven moles of formaldehyde, after standing several days the oil undergoes a gradual increase in the viscosity at 100° F. with a consequent loss in the viscosity index.

It has now been found that oils containing viscosity index improvers of the polyacrylic ester type and the metallo-organic detergents of the type just mentioned can have both good detergent qualities as well as a good viscosity index provided certain oil-soluble alkyl-phenol polyether alcohols are added thereto. The latter type of compound is termed a viscosity stabilizer hereinafter.

The oil-soluble polymeric esters of the acrylic series which are used in oils according to the present invention are the polymers of a monomer having the structure of Formula I:

I $$CH_2=CRCXR'$$

where R is hydrogen or methyl, X is oxygen or sulfur, and R' is a monovalent saturated hydrocarbon radical having at least four carbon atoms, and preferably from 8 to 18 carbon atoms.

Homopolymers and copolymers of the esters of acrylic or α-methacrylic acids with butyl, amyl, hexyl, cyclohexyl, heptyl, decyl, dodecyl, myristyl, cetyl or octadecyl alcohols or mercaptans may be employed. The copolymers may contain various proportions of lower alkyl acrylate or methacrylate esters, such as methyl, ethyl, propyl, or isopropyl acrylates or methacrylates provided sufficient of the higher alkyl ester is preesnt to impart sufficient oil-solubility to permit the incorportaion of 0.1 to 10% of the polymers in the oil. For example, a copolymer of cetyl methacrylate with a lesser proportion of ethyl methacrylate may be employed. Copolymers containing two or more of the higher alkyl esters, such as a copolymer of butyl methacrylate or lauryl methacrylate or of butyl methacrylate and cetyl methacrylate, are extremely useful. The copolymers may contain up to 10% by weight of basic comonomers, such as dimethylaminoethyl acrylate or methacrylate, N-(dimethylaminoethyl)-acrylamide, N-phenyl acrylamide, or N-dimethylmethacrylamide.

One important group of the metallo-organic detergents are the oil-soluble alkaline earth metal salts and especially the calcium, barium and strontium salts of the condensates of three to ten moles of an alkyl-phenol with at least two to seven moles of formaldehyde having the general structure of Formula II:

II

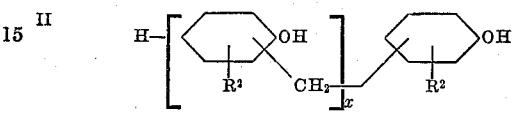

where x is an integer having a value of two to nine, and $R^2$ is an alkyl group having six to twelve carbon atoms.

The preparation of a typical aldehyde-phenol condensate salt of this type may be illustrated by reference to the use of calcium salts of methylene bis p-iso-octylphenol. This compound was prepared by condensing phenol and diisobutylene to yield an (principally para) iso-octylphenol. This was then condensed with formaldehyde to yield the resinous condensation product containing about five molecules of iso-octylphenol per molecule of resin, but which for convenience is called methylene bis p-isooctylphenol. The condensate was converted to the calcium salt by reaction with lime as follows: About equal weights of resin and CaO were ground together to a fine powder. Water was added and the mixture was heated on a steam bath in an open vessel. A vigorous reaction took place involving hydration of CaO and formation of the phenate salt. The salt was taken up in warm benzene and filtered from excess $Ca(OH)_2$. The bulk of the benzene was removed by distillation at atmospheric pressure; the remainder of the solvent was stripped under reduced pressure. The resulting residue, a glassy amorphous solid, was then ground to a yellow-green powder. The sulfate ash values of different batches varied from about 20% to 22%.

Another group includes the calcium, barium, strontium, and aluminum salts of phenols substituted by one or more alkyl groups having 8 to 18 carbons, e. g. aluminum dicetyl phenate. Another group includes the alkaline earth metal salts of phenol sulfides substituted by one or more alkyl groups having 4 to 18 carbons, e. g. basic barium dibutyl phenol sulfide having the structure of Formula IIa:

IIa

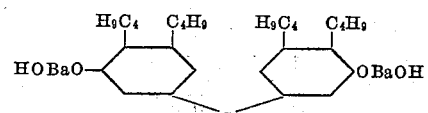

the calcium octylphenol disulfide of Formula IIb:

IIb

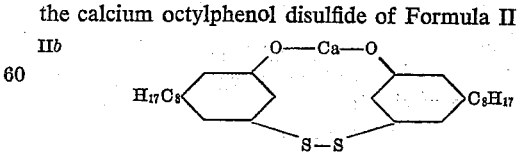

and barium amyl phenol sulfide of Formula IIc:

IIc

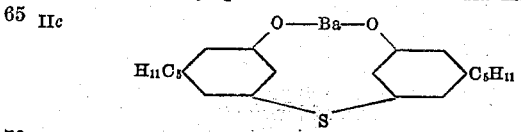

The viscosity stabilizer, which is added in accordance with this invention to compositions containing a polymer of Formula I and an alkaline earth metal or aluminum phenate, such as the compounds of Formulas II, IIa, IIb, and IIc to make a suitable oil additive composition, is an oil-soluble water-insoluble alkylphenyl polyether alcohol having the structure of Formula III:

III

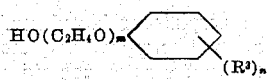

$$\mathrm{HO(C_2H_4O)_m}\underset{(R^3)_n}{\bigcirc}$$

where $m$ is an integer having an average value of 3 to 5, $n$ is an integer having a value of 1 to 3, and $R^3$ is one or more identical or different alkyl groups, at least one of which as from 7 to 12 carbon atoms, the total number of carbon atoms in $(R^3)_n$ being from 7 to 18.

The oil additive composition which contains these three components may comprise from one to 100 parts of the polymer of Formula I, from 10 to 50 parts of a salt of a compound of Formula II and from 1 to 10 parts of the viscosity stabilizer having the structure of Formula III, all of the parts being by weight. Preferably the composition contains 10 to 30 parts of the polymer of Formula I, 25 to 40 parts of the salt of the compound of Formula II, and 2.5 to 4 parts of the viscosity stabilizer having Formula III. The additive composition may also contain some mineral oil, which may amount to 20% to 80% by weight of the entire composition, to thin it down to a condition wherein it is easily miscible into the main lubricating oil stock. The amount of this additive composition to be incorporated in the oil may vary with different oils but generally 3% to 15% by weight of the thinned additive composition is incorporated with 97% to 85% respectively of the mineral lubricating oil. Preferably the compounded lubricating oil contains 88% to 93% mineral oil base and 12% to 7% respectively of the thinned additive composition.

In general, the compounded lubricating oil may contain from 0.1% to 10% by weight, preferably 0.25% to 2%, of the polymer of Formula I; from 1% to 5%, preferably 2.5% to 4%, of the alkaline earth metal salt of the compound of Formula II; and from 0.1% to 1%, preferably 0.25% to 0.4% of the viscosity stabilizer of Formula III.

In addition to the several types of additives required for the present invention, there may also be incorporated into the oil other additives for other purposes, such as to reduce corrosion of which amine or sulfur anti-oxidants are representative, as in dodecyl mercaptan or higher alkyl thiophenes, such as octyl thiophene or aminophenols, such as benzylaminophenol, or p-phenylene diamine.

In the following examples, which are illustrative of the invention, the parts and percentages are by weight unless otherwise specified:

EXAMPLE 1

Table I summarizes the viscosity index change obtained on standing for nine days of three sets of oils as follows: (1) lubricating oil containing 98.5% of a neutral mineral oil and 1.5% of a copolymer of 60% by weight of a mixture of higher esters from lauryl to stearyl methacrylates with 40% of a mixture of lower esters from butyl to octyl methacrylates for improving the viscosity index of the mineral base; (2) an oil containing about 95.5% of the same neutral mineral oil plus 1.5% of the polymer just described plus about 3% of the calcium salt of a condensate of 5 moles of tert-octylphenol with about 4 moles of formaldehyde; (3) the third lubricating oil comprised about 95% of the same neutral mineral oil, 1.5% of the same polymer, about 3% of the same calcium salt and 0.5% of a viscosity index stabilizer consisting essentially of tert-octylphenoxypolyethoxyethanol having 5 oxyethylene units. The results in the table show that the addition of the copolymer as the sole additive in the oil provided a stable viscosity index improvement which did not change appreciably during the 9 days' storage. However, when the calcium salt detergent was added as well as the copolymer, there was a loss in viscosity index during the 9 days' storage which was quite appreciable. The final test of the oil containing the copolymer, the calcium salt detergent and 0.5% of the viscosity stabilizer of the present invention shows that the viscosity index has been restored to a stable condition since there is no appreciable change therein during the 9 days' storage.

*Table I*

| Oil, Percent | Percent Polymer | Percent Phenate | Percent Stabilizer | No. of Days Stored | Visc., 210° F., SUS | Visc., 100° F., SUS | Visc. Index | SUS Gain, 100° F. | Unit V.I. Loss |
|---|---|---|---|---|---|---|---|---|---|
| 98.5 | 1.5 | | | 0 | 58.8 | 271 | 140.6 | | |
| 98.5 | 1.5 | | | 3 | 58.8 | 272 | 140.3 | | 0.3 |
| 98.5 | 1.5 | | | 9 | 58.8 | 272 | 140.3 | 1 | 0.3 |
| 95.5 | 1.5 | 3 | | 0 | 61.2 | 331 | 130.2 | | |
| 95.5 | 1.5 | 3 | | 3 | 61.0 | 341 | 127.1 | 10 | 3.1 |
| 95.5 | 1.5 | 3 | | 9 | 60.7 | 350 | 123.9 | 19 | 6.1 |
| 95 | 1.5 | 3 | 0.5 | 0 | 62.2 | 329 | 133.6 | | |
| 95 | 1.5 | 3 | 0.5 | 3 | 62.3 | 330 | 133.6 | 1 | 0 |
| 95 | 1.5 | 3 | 0.5 | 9 | 62.2 | 330 | 133.6 | 1 | 0 |

EXAMPLE 2

Varying amounts from 0.1% to 0.4% by weight of the same viscosity stabilizer as that of Example 1 are added to several portions of oil comprising from 95% to 95.5% of a neutral mineral oil base, 1.5% of the same copolymer as that of Example 1 and about 2.5% of the same calcium salt used in Example 1 as the detergent. Table II shows the gradually increasing benefits obtained by gradually increasing the amounts of the viscosity index stabilizer of the present invention:

*Table II*

| Percent Stabilizer | No. of Days Stored | Visc., 210° F., SUS | Visc., 100° F., SUS | Visc. Index | SUS Gain, 100° F. | Unit V.I. Loss |
|---|---|---|---|---|---|---|
| 0.0 | 0 | 62.6 | 343 | 130.1 | | |
| 0.0 | 3 | 62.5 | 355 | 128.1 | 12 | 2.0 |
| 0.1 | 9 | 62.2 | 354 | 127.7 | 11 | 2.4 |
| 0.1 | 0 | 62.4 | 337 | 132.1 | | |
| 0.1 | 3 | 62.4 | 343 | 130.6 | 6 | 1.5 |
| 0.1 | 9 | 62.4 | 343 | 130.6 | 6 | 1.5 |
| 0.2 | 0 | 62.4 | 333 | 133.3 | | |
| 0.2 | 3 | 62.2 | 335 | 132.2 | 2 | 1.1 |
| 0.2 | 9 | 62.4 | 335 | 132.7 | 2 | 0.6 |
| 0.3 | 0 | 62.3 | 331 | 133.7 | | |
| 0.3 | 3 | 62.3 | 332 | 133.3 | 1 | 0.4 |
| 0.3 | 9 | 62.2 | 331 | 133.2 | 0 | 0.5 |
| 0.4 | 0 | 62.3 | 331 | 133.6 | | |
| 0.4 | 3 | 62.3 | 331 | 133.6 | 0 | 0.0 |
| 0.4 | 9 | 62.4 | 330 | 134.0 | −1 | 0.4 |
| 0.5 | 0 | 62.5 | 330 | 134.1 | | |
| 0.5 | 3 | 62.5 | 331 | 134.1 | 1 | 0.0 |
| 0.5 | 9 | 62.5 | 331 | 134.0 | 1 | 0.1 |

EXAMPLE 3

Table III shows that improvement obtained by the addition of two different viscosity stabilizers in slightly different amounts to a compound oil containing about 95.5% of a neutral mineral oil base, 1.5% of a copolymer of about equal parts by weight of cetyl methacrylate with amyl methacrylate, and about 3% by weight of the same calcium salt as was used in Example 1 as the detergent. The viscosity stabilizer A of the table is the same as that used in Examples 1 and 2. The viscosity stabilizer B of the table is the same except that instead of 5 oxyethylene units, it contains 3 oxyethylene units.

Table III

| Percent Stabilizer | Type | No. of Days Stored | Visc., 210° F., SUS | Visc., 100° F., SUS | Visc. Index | SUS Gain, 100° F. | Unit V. I. Loss |
|---|---|---|---|---|---|---|---|
| 0.0 | | 0 | 61.9 | 323 | 134.4 | | |
| 0.0 | | 3 | 61.9 | 346 | 128.5 | 23 | 5.9 |
| 0.0 | | 9 | 61.7 | 352 | 126.3 | 29 | 8.1 |
| 0.3 | A | 0 | 61.8 | 309 | 137.6 | | |
| 0.3 | A | 3 | 61.8 | 309 | 137.6 | 0 | 0.0 |
| 0.3 | A | 9 | 61.8 | 310 | 137.5 | 1 | 0.1 |
| 0.4 | B | 0 | 61.7 | 310 | 137.3 | | |
| 0.4 | B | 3 | 61.8 | 311 | 137.1 | 1 | 0.2 |
| 0.4 | B | 9 | 61.6 | 311 | 137.1 | 1 | 0.2 |

EXAMPLE 4

An oil additive was made by mixing five parts of a copolymer of 20% of stearyl acrylate with 80% of cyclohexyl acrylate, 6.5 parts of the barium salt of a condensate of three moles of lauryl phenol with two moles of formaldehyde, and 0.5 part of lauryl phenoxypolyethoxyethanol containing four oxyethylene units. When this composition was added to a neutral mineral oil base in an amount to make from 3% to 12% of the entire weight of the compounded oil, it served to depress the pour point and at the same time provided improved detergency and viscosity index which was stable on storage.

EXAMPLE 5

An oil additive composition is made of a mixture of three parts of a homopolymer of lauryl methacrylate, 2 parts of the strontium salt of a condensate of 7 moles of decylphenol with 6 moles of formaldehyde, and 0.3 part of decylphenoxypolyethoxyethanol containing 5 oxythylene units. The addition of 5%, 7%, and 10% of this additive composition to different batches of a neutral mineral oil base improved the detergency and provided an improved viscosity index which was stable on storage.

EXAMPLE 6

An oil additive composition is made of a mixture of 2 parts of a copolymer of about 1 part of stearyl methacrylate with 2 parts of lauryl methacrylate, 1.5 parts of aluminum dicetyl phenate, and 0.3 part of t-octylphenoxypolyethoxyethanol containing an average of 4 oxyethylene units. This mixture was added to 96.2 parts of a neutral oil having a viscosity of 180 Saybolt Universal seconds (SUS) at 100° F. The oil obtained showed no change in viscosity on storage. Without the ethylene oxide-modified t-octylphenol, the viscosity of the oil containing the same amounts of the polymer and the phenate changed from 369 SUS at 100° F. to 378 SUS at 100° F. after 9 days' storage at room temperature.

EXAMPLE 7

The procedure of Example 6 is repeated substituting for the polymer, 2 parts of a copolymer of about 4 parts of cetyl methacrylate with 1 part of butyl methacrylate, and substituting 0.3 part of barium amyl phenol sulfide of Formula IIc for the aluminum dicetyl phenate. The oil showed no change in viscosity on storage for 9 days at room temperature but without the ethylene oxide-modified t-octylphenol, the oil changed from a viscosity of 337 SUS at 100° F. to 349 SUS at 100° F. after 9 days' storage at room temperature.

It is to be understood that changes and variations may be made without departing from the spirit and scope of the invention as defined in the appended claims.

We claim:

1. A composition adapted to improve a lubricating oil to which it is added consisting essentially of (1) about 1 to 100 parts by weight of an oil-soluble polymer of at least one compound of the formula.

$$CH_2=CRCOOR'$$

where R is selected from the group consisting of hydrogen and methyl, and R' is a monovalent saturated hydrocarbon radical having 4 to 18 carbon atoms, (2) about 10 to 50 parts by weight of an oil-soluble alkaline earth metal salt of a condensate of three to ten moles of a higher alkyl-substituted phenol with at least two to seven moles of formaldehyde, the alkyl substituent in the phenol having from 6 to 12 carbon atoms, and (3) about 1 to 10 parts by weight of an oil-soluble polyether alcohol having the formula III

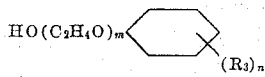

where $m$ is an integer having an average value of 3 to 5, $n$ is an integer having a value of 1 to 3, and $R^3$ is an alkyl group, at least one of which has from 7 to 12 carbon atoms, the total number of carbon atoms in $(R_3)_n$ being from 7 to 18.

2. A composition adapted to improve a lubricating oil to which it is added consisting essentially of about 10 to 30 parts by weight of an oil-soluble polymer of at least one compound of the formula $$CH_2=CRCOOR'$$

where R is selected from the group consisting of hydrogen and methyl, and R' is a monovalent saturated hydrocarbon radical having 4 to 18 carbon atoms, about 25 to 40 parts by weight of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 2.5 to 4 parts by weight of an oil-soluble polyether alcohol having the Formula III as defined in claim 1.

3. A lubricating oil consisting essentially of a mixture of a mineral oil, about 0.1 to 10% of an oil-soluble polymer of a least one compound of the formula $$CH_2=CRCOOR'$$

where R is selected from the group consisting of hydrogen and methyl, and R' is a monovalent saturated hydrocarbon radical having 4 to 18 carbon atoms, about 1 to 5% of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 0.1 to 1% of an oil-soluble polyether alcohol having the Formula III as defined in claim 1.

4. A lubricating oil consisting essentially of a mixture of a mineral oil, about 0.25 to 2% of an oil-soluble polymer of at least one compound of the formula $$CH_2=CRCOOR'$$

where R is selected from the group consisting of hydrogen and methyl, and R' is a monovalent saturated hydrocarbon radical having 4 to 18 carbon atoms, about 2.5 to 4% of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 0.25 to 0.4% of an oil-soluble polyether alcohol having the Formula III as defined in claim 1.

5. A lubricating oil additive consisting essentially of about 1 to 100 parts by weight of an oil-soluble copolymer of about 60% by weight of a mixture of higher esters from lauryl to stearyl methacrylates with about 40% by weight of a mixture of lower esters from butyl to octyl methacrylates, about 10 to 50 parts by weight of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 1 to 10 parts by weight of an oil-soluble t-octylphenoxypolyethoxyethanol containing an average of about 3 to 5 oxyethylene units.

6. A lubricating oil additive consisting essentially of about 1 to 100 parts by weight of an oil-soluble copolymer of about equal parts by weight of cetyl methacrylate and amyl methacrylate, about 10 to 50 parts by weight of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 1 to 10 parts by weight of an oil-soluble t-octylphenoxypolyethoxyethanol containing an average of about 3 to 5 oxyethylene units.

7. A lubricating oil additive consisting essentially of about 1 to 100 parts by weight of an oil-soluble copolymer of about 20% of stearyl acrylate with about 80% of cyclohexyl acrylate, about 10 to 50 parts by weight of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 1 to 10 parts by weight of an oil-soluble lauryl phenoxypolyethoxyethanol containing an average of about 4 oxyethylene units.

8. A lubricating oil consisting essentially of mineral oil, about 0.1 to 10% of an oil-soluble copolymer of about 60% by weight of a mixture of higher esters from lauryl to stearyl methacrylates with about 40% by weight of a mixture of lower esters from butyl to octyl methacrylates, about 1 to 5% of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 0.1 to 1% of an oil-soluble t-octylphenoxypolyethoxyethanol containing an average of about 3 to 5 oxyethylene units.

9. A lubricating oil consisting essentially of mineral oil, about 0.1 to 10% of an oil-soluble copolymer of about equal parts by weight of cetyl methacrylate and amyl methacrylate, about 1 to 5% of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 0.1% to 1% of an oil-soluble t-octylphenoxypolyethoxyethanol containing an average of about 3 to 5 oxyethylene units.

10. A lubricating oil consisting essentially of mineral oil, about 0.1 to 10% of an oil-soluble copolymer of about 20% of stearyl acrylate with about 80% of cyclohexyl acrylate, about 1 to 5% of an oil-soluble alkaline earth metal salt of a condensate of 3 to 10 moles of a higher alkyl-substituted phenol with at least 2 to 7 moles of formaldehyde, the alkyl substituent in the phenol having from 6 to 12 carbon atoms, and about 0.1 to 1% of an oil-soluble laurylphenoxypolyethoxyethanol containing an average of about 4 oxyethylene units.

References Cited in the file of this patent

UNITED STATES PATENTS

| | | |
|---|---|---|
| 2,410,652 | Griffin et al. | Nov. 5, 1946 |
| 2,411,150 | Evans | Nov. 19, 1946 |
| 2,485,376 | Glavis et al. | Oct. 18, 1949 |
| 2,602,048 | Michaels | July 1, 1952 |
| 2,681,315 | Tongberg et al. | June 15, 1954 |